United States Patent
Rimmer

(10) Patent No.: US 6,218,622 B1
(45) Date of Patent: Apr. 17, 2001

(54) POWER DISTRIBUTION LINE

(75) Inventor: John Philip Rimmer, Chingford (GB)

(73) Assignee: Tunewell Technology LTD, London (GB)

(*) Notice: Subject to any disclaimer, the term of this patent is extended or adjusted under 35 U.S.C. 154(b) by 0 days.

(21) Appl. No.: 09/284,333

(22) PCT Filed: Oct. 10, 1997

(86) PCT No.: PCT/GB97/02795

§ 371 Date: Jun. 25, 1999

§ 102(e) Date: Jun. 25, 1999

(87) PCT Pub. No.: WO98/16982

PCT Pub. Date: Apr. 23, 1998

(30) Foreign Application Priority Data

Oct. 11, 1996 (GB) .................................................. 9621352

(51) Int. Cl.⁷ ...................................................... H01B 7/08
(52) U.S. Cl. ........................................................ 174/117 FF
(58) Field of Search ........................... 174/117 F, 117 FF, 174/36, 70 C, 250, 256

(56) References Cited

U.S. PATENT DOCUMENTS

| | | | |
|---|---|---|---|
| 2,060,913 | * 11/1936 | Weaver | 174/117 FF |
| 3,671,675 | * 6/1972 | Ress | 174/70 C X |
| 4,540,224 | * 9/1985 | Maros | 439/98 |
| 4,894,124 | * 1/1990 | Walsh et al. | 204/30 |
| 5,172,310 | 12/1992 | Deam et al. | 363/144 |
| 5,847,324 | * 12/1998 | Farquhar et al. | 174/117 FF |

FOREIGN PATENT DOCUMENTS

| | | |
|---|---|---|
| 0 407 167 | 1/1991 | (EP) . |
| 1-213916 | 8/1989 | (JP) . |

OTHER PUBLICATIONS

E.J. Rymaszewski et al.: "D.C. Power distribution System", IBM Technical Disclosure Bulletin, vol. 5, No. 2, Jul. 1962, p. 29 XP002053387.

* cited by examiner

Primary Examiner—Dean A. Reichard
Assistant Examiner—Chau N. Nguyen
(74) Attorney, Agent, or Firm—Armstrong, Westerman, Hattori, McLeland & Naughton, LLP

(57) ABSTRACT

A distribution line for distributing high frequency alternating electric current having a first substantially flat conductor (1) and also a second substantially flat conductor (2), the two conductors being located in spaced parallelism and being separated by an insulator (3), at least one of the conductors (2) being associated with a further element (4) of a material of high relative permeability. A second element (5) of high permeability may be associated with the other conductor (1).

14 Claims, 2 Drawing Sheets

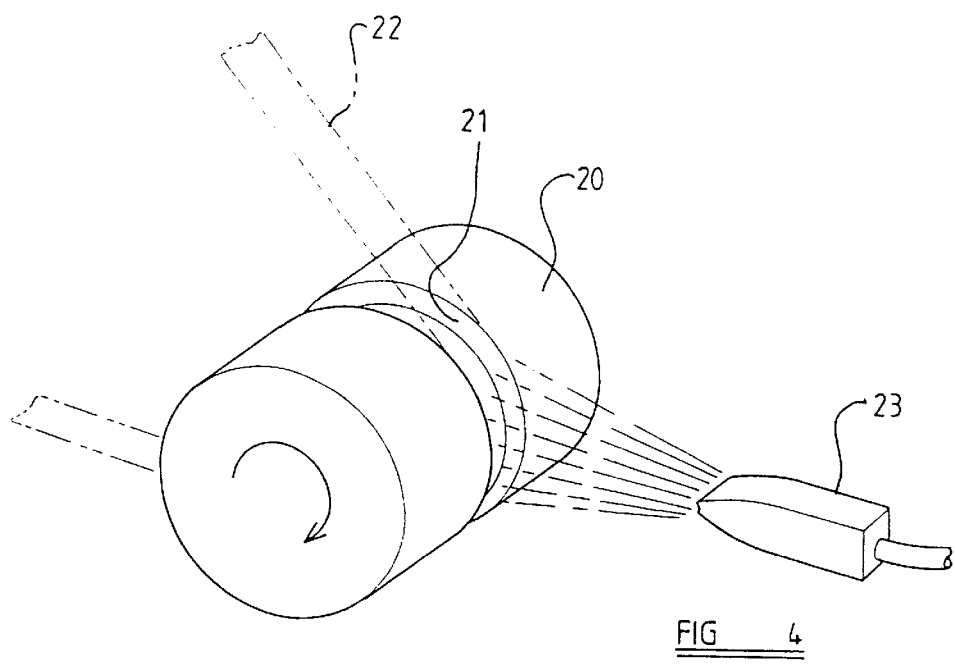
FIG 4
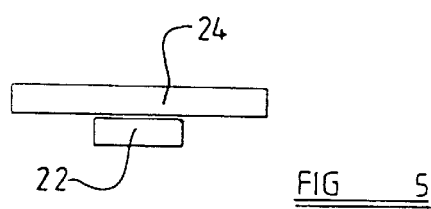
FIG 5
FIG 6
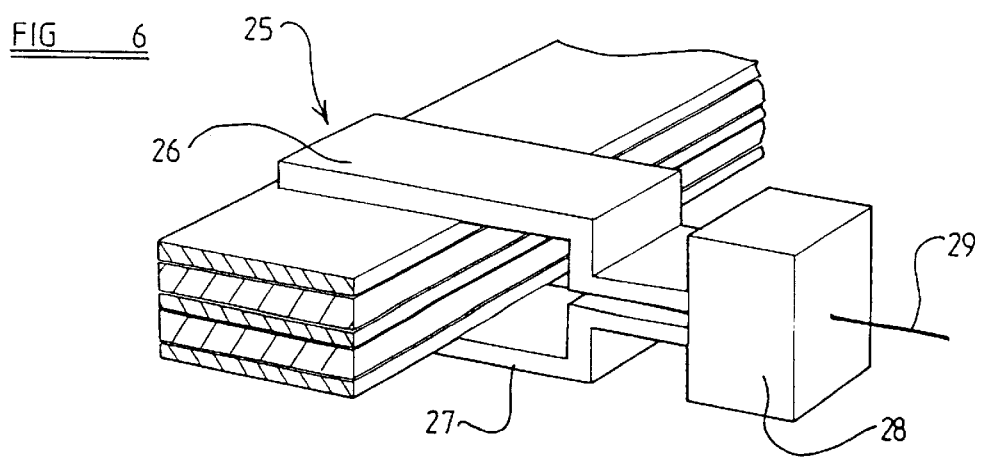

POWER DISTRIBUTION LINE

FIELD OF THE INVENTION

THE PRESENT INVENTION relates to an electric power distribution line and, more particularly, relates to a power distribution line suitable for distributing a high frequency alternating current electric power supply.

DESCRIPTION OF THE RELATED ART

It has been found desirable to power a number of devices, which may be at spaced locations within a specific locality or area, from a single high frequency alternating current power supply. Such a system possesses various advantages including the advantage that one power supply can power many devices, thus reducing cost, and the power supply itself may be sited away from the particular devices which are powered by the electricity. This avoids the need for bulky power supplies to be located at the point of use.

Further advantages are that one power supply can power many devices which have different voltage and/or current requirements, by using different coupling transformers between the power distribution line and the various devices which are supplied with power. Other advantages also exist.

In a relatively low voltage alternating current power distribution system which operates at a voltage of up to 100 volts or even up to 1 kv, with a frequency of between 20 kHz and 2 MHz, a major problem that is experienced is the broadcast interference that derives from the "H" field or magnetic field that is generated as a result of the relatively high level of current in the system.

It is understood that the total value of the flux of the H field produced by a sinusoidal alternating current in a circuit depends upon the total area created by the circuit loop. The larger the loop the greater the total flux.

It has been proposed to distribute high frequency power using different types of power distribution line.

It has been proposed to use a wire pair, where the wires are kept parallel to and adjacent to each other by a common insulating sheath. This minimises the loop area defined between the wires and thus minimises the flux. Whilst this is a cheap expedient, with only a medium flux, there is a very high local field. A twisted wire pair, in which two separate insulated wires are kept adjacent each other by twisting one wire around the other, is also very cheap and has the advantage of a low distant field, since the effectively "rotating" field cancels at a distance. However, a very high local field is still experienced.

More expensive prior proposed distribution lines include screened wires where, for example, a twisted pair is provided with a magnetic foil screen wrapping, or a co-axial cable. These expedients are more expensive, but may be more difficult to establish electrical connections.

SUMMARY OF THE INVENTION

The present invention seeks to provide an improved power distribution line.

According to this invention there is provided a distribution line for distributing high frequency alternating electric current which comprises a first substantially flat conductor and a second substantially flat conductor, the two conductors being located in spaced parallelism and being separated by an insulator, at least one of the conductors being associated with a further element formed of a material of high relative permeability.

Preferably a second element of high permeability is provided associated with the other conductor.

In one embodiment the or each element of high permeability is connected directly to the, or the respective, conductor.

Alternatively an insulator is located between the or each element of high permeability and the associated conductor.

Preferably the or each element of high relative permeability extends laterally beyond the associated flat conductor.

Conveniently each conductor is formed of copper or a copper alloy.

Advantageously the or each element of high permeability is formed of a amorphous or nano-crystalline metal.

Preferably the metal forming the high permeability element or elements is steel or a cobalt/steel alloy.

Conveniently the or each element of high permeability has a relative permeability of the order of $10^5$.

Preferably the or each element formed of a material of high relative permeability is a foil.

Conveniently the or each first conductor comprises a core and, on each side of the core, a plurality of portions of the conductor extending in parallelism with the core.

The distribution line may be provided with an outer insulating sleeve.

The distribution line may be associated with a clip, the clip having two arms, the arms being in electrical contact, respectively, with the two conductors.

The invention also relates to a method of making a component for a distribution line, as described above, comprising the steps of passing a copper tape around a cooled rotating drum and spraying on to the copper tape a material, which, when cooled in contact with the drum, forms a foil of material of high permeability.

BRIEF DESCRIPTION OF THE DRAWINGS

In order that the invention may be more readily understood, and so that further features thereof may be appreciated, the invention will now be described, by way of example, with reference to the accompanying drawings in which FIG. 4 is an illustration of a drum utilised in producing a component of the embodiment of FIG. 1, and FIG. 5 is a view of the component produced using the drum.

FIG. 6 illustrates the transmission line of FIG. 2.

DETAILED DESCRIPTION OF THE INVENTION

Figure 1:
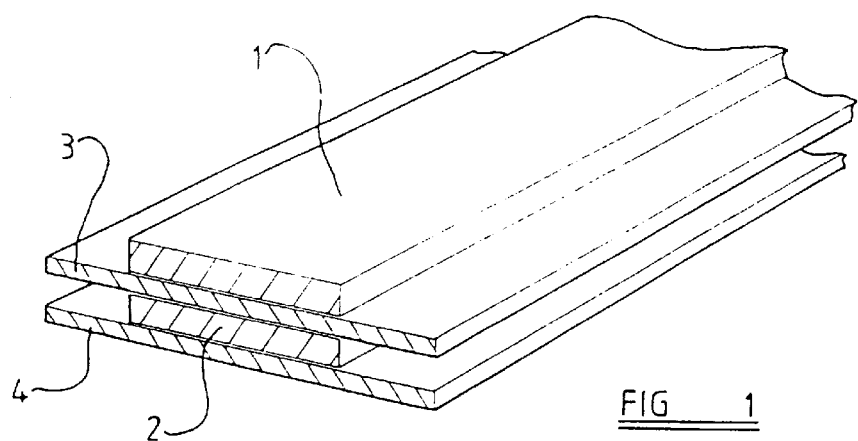
FIG. 1 is a view of a power transmission line in accordance with the invention, with parts thereof cut away for the sake of clarity of illustration.

Referring initially to FIG. 1 of the accompanying drawings, a power transmission line is illustrated which is suitable for use in transmitting power of a voltage up to for example, 100 volts or even up to 1 kv, (typically at a voltage of 84 volts) and at an operating frequency of between 20 kHz to 2 MHz, preferably in the frequency range of 20–200 kHz, most preferably at a frequency of 60 kHz. The power transmission line comprises two principal conductors 1,2. Each of the conductors is of substantially rectangular cross-section, with two opposed parallel flat faces. The conductors may be formed of copper or copper alloy and may have a thickness of between 0.025 and 0.25 mm, and a width of up to 30 mm, depending upon the current to be carried.

The two conductors are separated by a sheet of insulating material 3. The insulating material may be an appropriate plastic such as a polyester, polypropylene or polyphenylene sulphide. The thickness of the insulating sheet 3 depends upon the voltage to be carried by the conductors 1 and 2 and may typically be of the order of 0.1 millimeters.

It is to be observed that the insulating sheet 3, in the embodiment illustrated in FIG. 1, has such a width that it extends beyond the conductors 1 and 2. Associated with the conductor 2 is a foil 4 which is made of a material having a high relative permeability. Typically the relative permeability of the foil may be of the order of $10^5$. The foil 4 is secured to the face of the conductive element 2 which is remote from the insulating layer 3. The foil 4 has a width which is greater than the width of the conductive element 2, so that parts of the foil project beyond the conductive element 2 on each side thereof.

The foil 4 may be formed from an amorphous or nano-crystalline metal, such as steel or a cobalt/steel alloy. Such a metal has a high resistivity.

Typically, a foil of high permeability of this type may be created by quenching cooling molten metal at a very high speed, for example, at a speed of $10^6$ degrees celsius per second. The molten metal may be sprayed to a cooled, rapidly rotating drum. The metal cools on the drum and may be removed from the drum in the form of a strip.

It has been found that the foil 4 of high relative permeability constitutes a low reluctance path for magnetic field and, when a distribution line, as illustrated in FIG. 1 is utilised, on the side of the transmission line where the foil is provided there is a 100 fold reduction in the flux that causes the radio frequency interference, (as compared with an equivalent transmission line without a foil of relatively high permeability) and on the other side of the transmission line there is a ten fold reduction in the flux.

A transmission line as shown in FIG. 1, therefore, can be utilised with substantial benefit. If the transmission line is utilised, for example, within a motor vehicle, the side of the transmission line carrying the foil 4 will be located adjacent the body of the motor vehicle which may have elements formed of plastic, aluminium or mild steel. A material such as mild steel is very "lossy" and if the transmission line is mounted in position so that the foil of high relative permeability is actually located between the conductors 1 and 2 and the mild steel components of the motor vehicle it is found that eddy-current losses are minimised.

The embodiment of FIG. 1 may be altered by providing a second foil corresponding to the foil 4, the second foil being secured to the exposed face of conductor 1.

Figure 2:
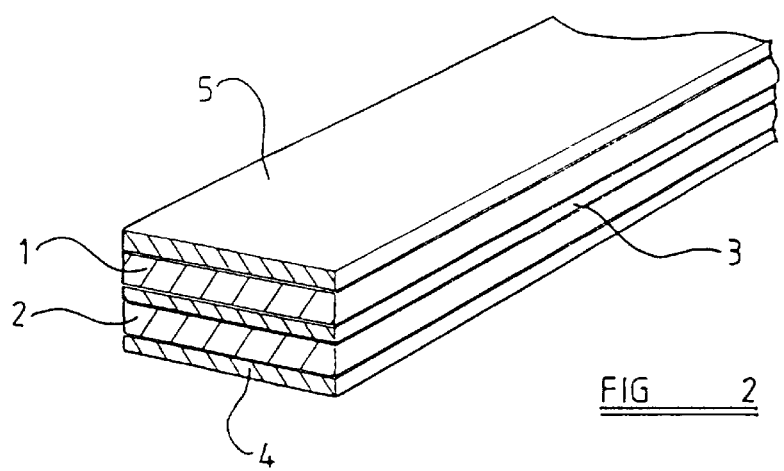
FIG. 2 is a view corresponding to FIG. 1 illustrating a second embodiment of the invention.

FIG. 2 illustrates a second embodiment of the invention in which the conductors 1 and 2 are as described above, with the insulating layer 3 being of the same width as that of the conductors 1 and 2. In this embodiment, a foil 4 of high permeability material is provided in contact with the conductor 2, but has the same width as the width of the conductor 2. A second foil 5, of high permeability material, which corresponds directly with foil 4, is connected to the conductor 1.

It has been found that by providing a foil of high relative permeability adjacent each of the conductors 1 and 2, the flux that generates the radio frequency interference signal is reduced, on each side of the distribution line, of a factor of approximately 1,000. In the embodiment of FIG. 2 the foils have the same width as the width of the conductors. This provides a transmission line which is easy to handle, and which, if desired, may be easily provided with an insulating sheath. However, because the foils 4 and 5 do not extend beyond the conductors, the shielding effect provided by the foils 4 and 5 is not as great as it would be if the foils 4 and 5 were wider than the conductors 1,2.

Figure 3:
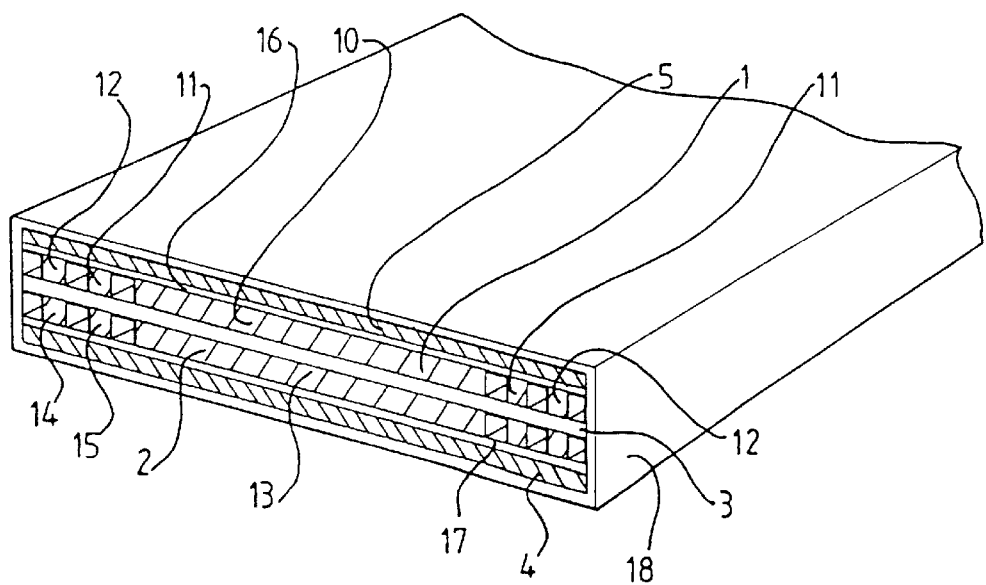
FIG. 3 is a view corresponding to FIGS. 1 and 2 illustrating a third embodiment of the invention.

FIG. 3 illustrates a further embodiment of the invention. In this embodiment of the invention, the copper conductor 1 is provided with a central core region 10 which extends axially of the transmission line and, on either side thereof, two further spaced apart regions 11,12, which extend in parallelism with the core region 10. Similarly the conductor 2 comprises a central core region 13 and, on either side, two further spaced apart regions 14,15. The conductors 1 and 2 are separated by an insulating layer 3. The conductor 1 is separated from a foil 5 of high permeability by a thin insulating layer 16. Equally, the conductor 2 is separated from the foil 4 by means of a thin insulating layer 17. The spaces between the various parts of each conductor 1 and 2 may be filled with an adhesive such as an acrylic adhesive.

The entire arrangement, as so far described, is covered by an outer sleeve 18 of an appropriate insulating material, such as a plastic material.

It is to be appreciated that in the embodiment of FIG. 3, the layers of foil of high permeability material are separated from the conductive layers with which they are associated by means of a respective thin layer of an insulating material.

It is to be appreciated that in the embodiment of FIG. 3, each conductive layer is formed of a central core and further components which extend parallel with that core but spaced therefrom. The provision of an arrangement of this type has been found to reduce eddy-currents which might otherwise occur at the edge of a relatively large flat conductive core. The provision of an adhesive between the various components of the conductive element help ensure that the various layers that form the laminate that constitutes the distribution line illustrated in FIG. 3, remain in a predetermined position relative to each other.

It has been found that distribution lines of the type described above provide very low inductance, low resistance and high capacitance. The capacitance provided by the distribution line can be incorporated into the circuit of the power generator which is utilised as a supply power through the distribution line, for example as part of a resonating circuit.

It is preferred to use an appropriate insulating material for the insulating sheet 3 between the conductors 1 and 2 so that the capacitance is of a high quality, that is to say with a low power loss. The polyester material mentioned above provides good characteristics and is suitable for use at a low to medium temperature. Polyphenylene provides better characteristics, but is only suitable for use at low temperatures. Polyethylene sulphide provides good properties, and is suitable for use at high to medium temperatures.

FIG. 4 illustrates a method of forming a component that forms part of the embodiment, for example, of FIG. 1. Referring to FIG. 4, a drum 20, made of an appropriate material, for example copper, is provided which is rotated swiftly. Means are provided to cool the interior of the drum. In the embodiment illustrated, a groove 21 is provided in the periphery of the drum. A tape 22 of copper is provided which is of the same cross-section as of the groove 21 and is fed through the groove. A spray 23 is provided adapted to spray molten steel or steel/cobalt alloy on to the periphery of the drum as it rotates. The spray cools very swiftly, since the drum surface is cooled, and as the tape 22 leaves the drum it carries with it a foil 24 of high permeability material as shown in FIG. 5. The foil has a greater width than the width of the copper tape.

FIG. 5 illustrates the cross-section of the copper tape 22 and the foil 24. It can be seen that the combination may be used as the conductor 2 and foil 4 of the embodiment of FIG. 1.

FIG. 6 illustrates the transmission line of FIG. 2. A clip 25 is provided which has two spaced apart blades 26,27 which engages the opposed faces of the transmission line. Although the high permeability foils 4 and 5 are amorphous and thus have a high resistance, nevertheless, since the blades 26,27 of the clip 25 engage a substantial area of the foils 4 and 5, the arms of the clip may provide an appropriate power-take-off. The arms of the clip may be connected, for example, to a housing 28 which contains an appropriate transformer, a lead 29 extending from the transformer to an item which is to be supplied with electrical power.

It is to be noted that if a transmission line as described above is utilised in such a way that the voltage applied to each conductor, relative to earth, is equal and opposite to the voltage applied to the other conductor,—in other words if the voltage is always a DC voltage of opposite polarities, or an alternating voltage in anti-phase about earth potential, then the electric field generated by the system is extremely small.

I claim:

1. A distribution line for distributing high frequency alternating electric current which comprises a first substantially flat conductor and a second substantially flat conductor, each conductor having flat faces, the two conductors being located in spaced parallelism and being separated by an insulator between opposing faces, at least one of the conductors being associated at a non-opposing face with an element formed of a material of high relative permeability.

2. A distribution line according to claim 1 where two of said elements are provided, each element is associated at the non-opposing face of each one of the conductors.

3. A distribution line according to claim 1 wherein each said element of high permeability is connected directly to the non-opposing face of its associated conductor.

4. A distribution line according to claim 1 wherein an insulator is located between each said element of high permeability and its associated conductor.

5. A distribution line according to claim 1 wherein each said element of high relative permeability extends laterally beyond its associated flat conductor.

6. A distribution line according to claim 1 wherein each conductor is formed of copper or a copper alloy.

7. A distribution line according to claim 1 wherein each said element of high permeability is formed of an amorphous or nano-crystalline metal.

8. A distribution line according to claim 7 wherein the metal forming each said high permeability element is steel or a cobalt/steel alloy.

9. A distribution line according to claim 1 wherein each said element of high permeability has a relative permeability of the order of $10^5$.

10. A distribution line according to claim 1 wherein each said element formed of a material of high relative permeability is a foil.

11. A distribution line according to claim 1 wherein each conductor comprises a core and, on each side of the core, a plurality of portions of the conductor extend in parallelism with the core.

12. A distribution line according to claim 1 provided with an outer insulating sleeve.

13. A distribution line according to claim 1 associated with a clip, the clip having two arms, the arms being in electrical contact, respectively, with the two conductors.

14. A method of making a component for a distribution line according to claim 1 comprising the steps of passing a copper tape around a cooled rotating drum and spraying on to the copper tape a material, which when cooled in contact with the drum, forms a foil of material of high permeability.

* * * * *